(12) United States Patent
Hiyama et al.

(10) Patent No.: US 7,852,390 B2
(45) Date of Patent: Dec. 14, 2010

(54) PHOTOELECTRIC CONVERSION DEVICE AND IMAGE PICKUP SYSTEM USING THE PHOTOELECTRIC CONVERSION DEVICE

(75) Inventors: Hiroki Hiyama, Kanagawa-ken (JP); Akira Okita, Kanagawa-ken (JP); Hideaki Takada, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/337,203

(22) Filed: Dec. 17, 2008

(65) Prior Publication Data
US 2009/0102955 A1  Apr. 23, 2009

Related U.S. Application Data

(62) Division of application No. 11/030,074, filed on Jan. 7, 2005, now Pat. No. 7,486,320.

(30) Foreign Application Priority Data
Jan. 29, 2004  (JP)  ............................. 2004-021542

(51) Int. Cl.
*H04N 3/14* (2006.01)
*H04N 5/335* (2006.01)
(52) U.S. Cl. .................... 348/300; 257/231; 348/308
(58) Field of Classification Search .................. None
See application file for complete search history.

(56) References Cited

U.S. PATENT DOCUMENTS

| | | | |
|---|---|---|---|
| 6,518,909 B1 | 2/2003 | Yang et al. | 341/155 |
| 6,633,334 B1 | 10/2003 | Sakurai et al. | 348/308 |
| 6,757,016 B1 | 6/2004 | Ueno et al. | 348/279 |
| 6,788,237 B1 * | 9/2004 | Bidermann et al. | 341/155 |
| 6,809,320 B2 | 10/2004 | Iida et al. | 250/338.4 |

(Continued)

FOREIGN PATENT DOCUMENTS

JP  2296470  12/1990

OTHER PUBLICATIONS

Kleinfelder, Lim, Liu, and El Gamal, "A 10000 Frames/s CMOS Digital Pixel Sensor", IEEE Journal of Solid State Circuits, vol. 36, No. 12, Dec. 2001.*

*Primary Examiner*—Jason Whipkey
*Assistant Examiner*—Dennis Hogue
(74) *Attorney, Agent, or Firm*—Fitzpatrick, Cella, Harper & Scinto

(57) ABSTRACT

It is a principle object of the present invention to reduce a voltage drop of a common power supply wiring in a plurality of amplification circuits to suppress crosstalk generated in other signal output lines. A photoelectric conversion device includes: a plurality of pixels each having a photoelectric conversion area; a plurality of signal output lines through which electrical signals are to be read out from the plurality of pixels; and a plurality of amplification circuits provided in correspondence to the plurality of signal output lines for amplifying the electrical signals, respectively, the plurality of amplification circuits including at least one constant current circuit portion and being disposed in a predetermined direction of repetitive dispersion, in which a constant current circuit portion includes at least a source grounded field effect transistor (the gate electrode is designated by reference symbol 124G), and a direction (X-axis direction) of a channel length of the source grounded field effect transistor is different from the direction of repetitive disposition of the amplification circuits.

8 Claims, 7 Drawing Sheets

U.S. PATENT DOCUMENTS

| | | | |
|---|---|---|---|
| 6,831,685 B1 | 12/2004 | Ueno et al. | 348/243 |
| 6,839,084 B1 | 1/2005 | Hiyama et al. | 348/241 |
| 6,850,278 B1 | 2/2005 | Sakurai et al. | 348/302 |
| 6,952,004 B2 | 10/2005 | Henderson | 250/214 A |
| 6,963,372 B1 | 11/2005 | Hiyama et al. | 348/302 |
| 6,965,408 B2 | 11/2005 | Hiyama et al. | 348/308 |
| 7,129,985 B1 | 10/2006 | Koizumi et al. | 348/312 |
| 7,142,233 B1 | 11/2006 | Ogawa et al. | 348/272 |
| 7,382,409 B2 | 6/2008 | Hiyama et al. | 348/308 |
| 7,456,882 B1 | 11/2008 | Hiyama et al. | 348/302 |
| 2001/0000068 A1 | 3/2001 | Isogai et al. | 257/443 |
| 2001/0010551 A1* | 8/2001 | Dierickx | 348/241 |
| 2002/0054390 A1 | 5/2002 | Koizumi et al. | 358/513 |
| 2003/0080340 A1* | 5/2003 | Henderson et al. | 257/72 |
| 2003/0107669 A1* | 6/2003 | Ito et al. | 348/370 |
| 2003/0117510 A1 | 6/2003 | Sakurai et al. | 348/308 |
| 2003/0230763 A1 | 12/2003 | Kimura et al. | 257/200 |
| 2004/0217396 A1* | 11/2004 | Lee | 257/292 |
| 2005/0052554 A1 | 3/2005 | Sakurai et al. | 348/301 |
| 2005/0168605 A1 | 8/2005 | Hiyama et al. | 348/301 |
| 2007/0176176 A1 | 8/2007 | Yamazaki et al. | 257/59 |

* cited by examiner

PHOTOELECTRIC CONVERSION DEVICE AND IMAGE PICKUP SYSTEM USING THE PHOTOELECTRIC CONVERSION DEVICE

RELATED APPLICATIONS

This application is a division of co-pending application Ser. No. 11/030,074, filed Jan. 7, 2005, which is incorporated by reference herein in its entirety, as if fully set forth herein, and claims the benefit of priority under 35 U.S.C. §119, based on Japanese Priority Application No. JP 2004-021542, filed Jan. 29, 2004, which is incorporated by reference herein in its entirety, as if fully set forth herein.

BACKGROUND OF THE INVENTION

1. Field of the Invention

The present invention relates to a photoelectric conversion device and an image pickup system using the photoelectric conversion device, and more particularly to a photoelectric conversion device including a plurality of pixels each having a photoelectric conversion area, a plurality of signal output lines through which electrical signals are to be read out from a plurality of pixels, and a plurality of amplification circuits which are provided in correspondence to a plurality of signal output lines in order to amplify the electrical signals and which includes at least one constant current circuit portion, and an image pickup system using the photoelectric conversion device.

2. Related Background Art

A photoelectric conversion device for amplifying and reading out signals from a plurality of pixels each having a photoelectric conversion area by column amplifiers, respectively, to read out successively the amplified signals from the column amplifiers by a scanning circuit is described in Japanese Patent Application Laid-Open No. H02-296470 for example.

FIG. 6 is a circuit diagram showing a configuration of a photoelectric conversion device described in Japanese Patent Application Laid-Open No. H02-296470. As shown in the drawing, a plurality of pixels for one column are connected to a column amplifier, as an amplification circuit, including a first MOS transistor M1 and a second MOS transistor M2. Thus, a signal from the pixel is inputted and amplified to be accumulated in the form of an offset signal (noise signal) and a sensor signal in capacitors CT1 and CT2 as temporary accumulation means, respectively.

Now, a large output resistance is required for a transistor constituting a constant current circuit in an inside of the column amplifier.

This reason is that if an operating current of the column amplifier changes, then a voltage drop in a common GND wiring into which the operating current is caused to flow changes accordingly (in FIG. 6, a voltage drop in $V_{vs}$ changes) to generate crosstalk in signals in other columns. For example, when amplifiers for 1,000 columns are disposed in a horizontal direction, and an operating current of each amplifier is 10 μA, then a current of 10 mA in total is caused to flow into the GND wiring. In this case, if the operating currents fluctuate in the amplifiers for 900 columns to be decreased by 1 μA, the current of 0.9 mA in total changes accordingly. A change in operating current is developed in the form of fluctuation of the voltage drop due to a parasitic resistance to exert an influence on an operation for reading the signal.

SUMMARY OF THE INVENTION

It is a principle object of the present invention to reduce a voltage drop of a common power supply wiring in a plurality of amplification circuits to suppress crosstalk generated in other signal output lines.

A photoelectric conversion device of the present invention includes: a plurality of pixels each having a photoelectric conversion area; a plurality of signal output lines through which electrical signals are to be read out from the plurality of pixels; and a plurality of amplification circuits provided in correspondence to the plurality of signal output lines for amplifying the electrical signals, respectively, the plurality of amplification circuits including at least one constant current circuit portion and being disposed in a predetermined direction of repetitive dispersion, in which the constant current circuit portion includes at least a field effect transistor, and a direction of a channel length of the field effect transistor is different from the direction of repetitive disposition of the amplification circuits.

According to the photoelectric conversion device of the present invention, a sufficient output resistance is obtained in the source grounded field effect transistor in the amplification circuits, whereby a voltage drop in a common power supply wiring of a plurality of amplification circuits can be reduced, and hence the crosstalk generated in other signal output lines can be suppressed.

DESCRIPTION OF THE PREFERRED EMBODIMENTS

Preferred embodiments of the present invention will hereinafter be described in detail with reference to the accompanying drawings.

Figure 1:
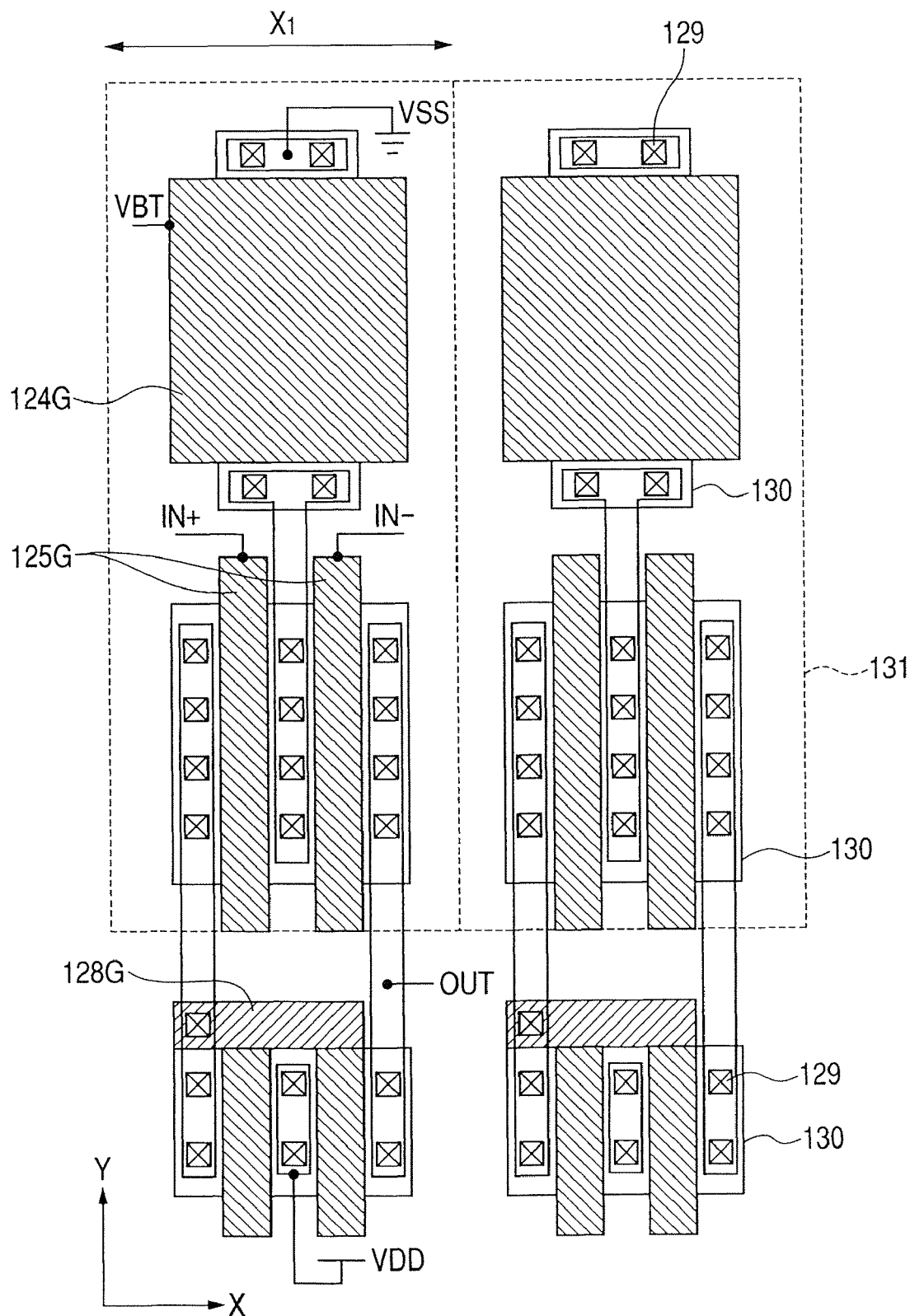
FIG. 1 is a plan view of an amplification circuit of a photoelectric conversion device according to a first embodiment of the present invention.
Figure 2:
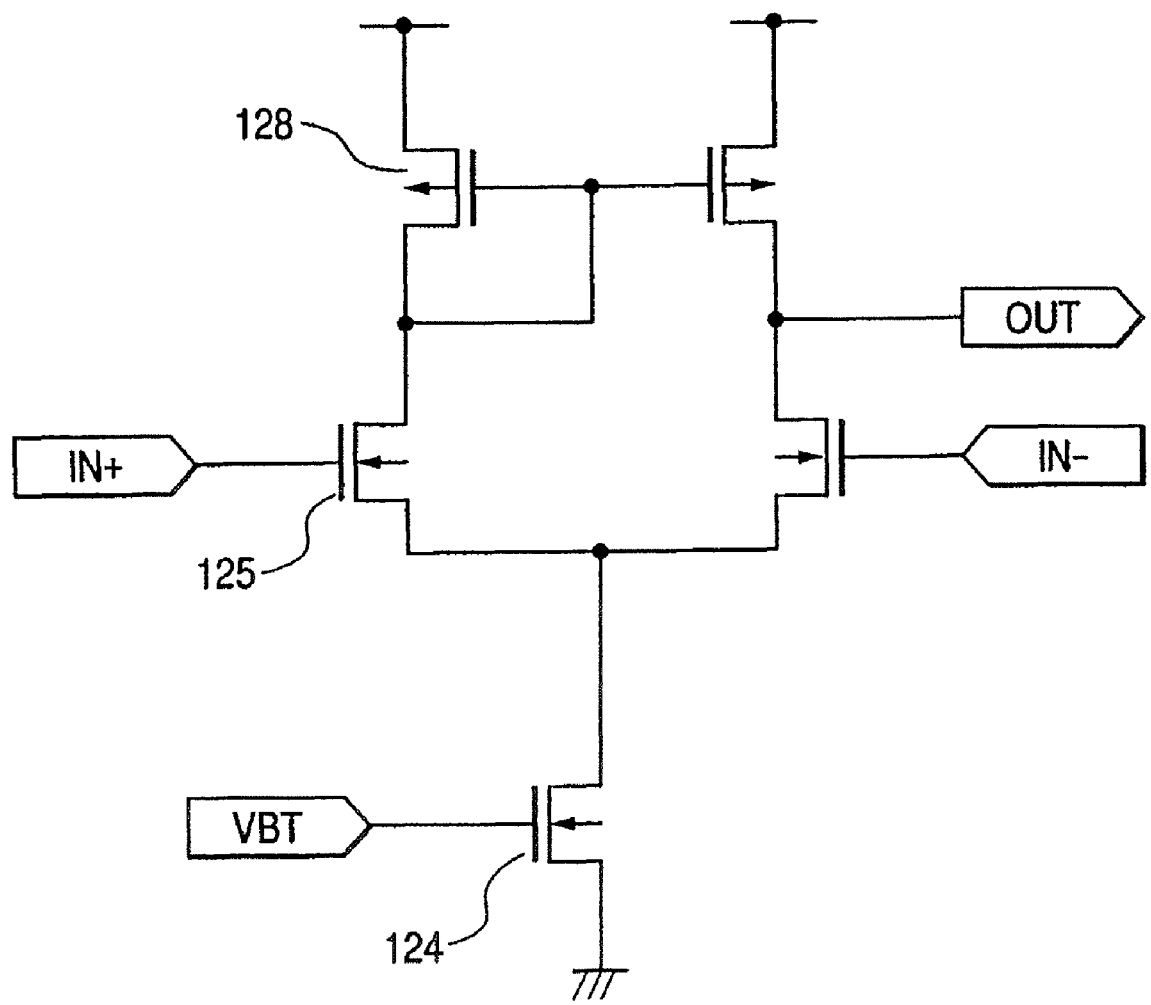
FIG. 2 is an equivalent circuit diagram of an amplification circuit of the photoelectric conversion device according to the first embodiment of the present invention.
Figure 3:
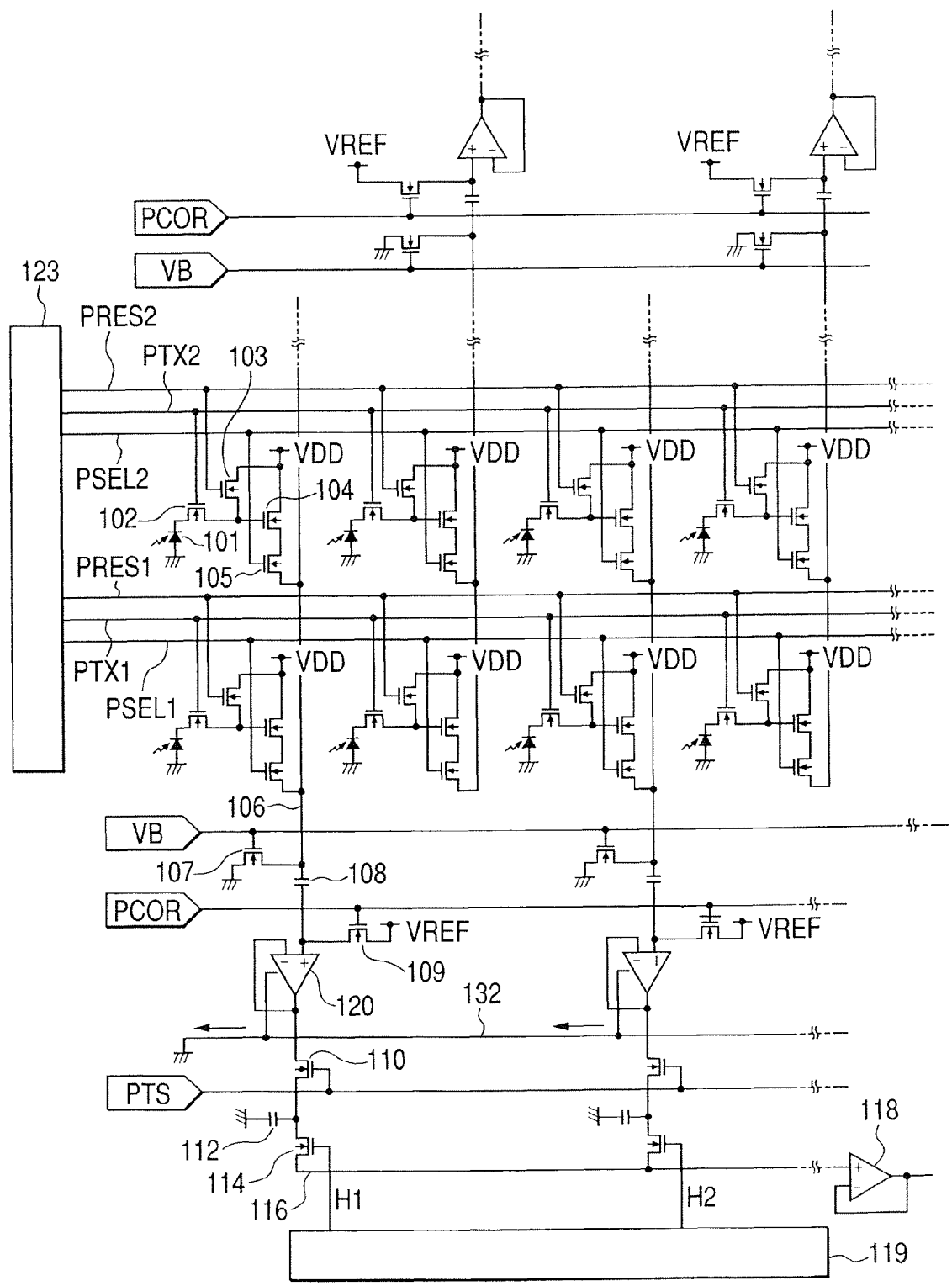
FIG. 3 is a block diagram showing a whole configuration of the photoelectric conversion device according to the first embodiment of the present invention.

FIG. 1 is a plan view of an amplification circuit of a photoelectric conversion device according to a first embodiment of the present invention; FIG. 2 is an equivalent circuit diagram of an amplification circuit of the photoelectric conversion device according to the first embodiment of the present invention; and FIG. 3 is a block diagram showing a whole configuration of the photoelectric conversion device according to the first embodiment of the present invention. While pixels for two rows are shown in FIG. 3, the pixels equal in number to or more than these pixels for two rows may be adopted. In addition, while the photoelectric conversion device is shown in the form of an area sensor in which the pixels are two-dimensionally disposed, a line sensor in which the pixels are one-dimensionally disposed may also be adopted as the photoelectric conversion device.

Referring to FIG. 3, one pixel includes: a photodiode 101; a pixel transfer switch 102 for transferring electric charges accumulated in the photodiode 101 to a floating diffusion region (not shown); a driver MOS transistor 104, as an amplification means, having an input portion common to the floating diffusion region; a reset switch 103 connected to the floating diffusion region; and a row selection switch 105 for selecting pixels belonging corresponding row among all the pixels.

The pixel transfer switch 102, the reset switch 103, and the row selection switch 105 are controlled with control signals PTX, PRES and PSEL from a vertical scanning circuit 123, respectively. Thus, signals from the pixels belonging to the row selected by the row selection switch 105 are outputted to vertical output lines 106, as signal output lines, which are alternately provided vertically in the drawing. Each vertical output line 106 connects the corresponding pixels and one terminal (+) of an operational amplifier 120 as an amplification circuit through a clamp capacitor 108. Reference numeral 107 designates a load MOS transistor and reference numeral 109 designates a clamp switch.

The signals amplified by the operational amplifier 120 are accumulated in an accumulation capacity 112 through a transfer gate 110 and are then successively outputted to a horizontal output line 116 through a horizontal transfer switch 114 controlled by a horizontal scanning circuit 119 to be outputted through an output amplifier 118. Reference numeral 132 designates a common GND wiring common to the operational amplifiers 120.

A configuration of an equivalent circuit of the operational amplifier 120 as the amplification circuit is shown in FIG. 2, and a plan view of the configuration of the operational amplifier 120 is shown in FIG. 1. In FIGS. 1 and 2, reference numeral 124 designates a source grounded field effect transistor of a constant current circuit portion; reference numeral 125 designates a field effect transistor as an input transistor of an input portion; reference numeral 128 designates a source grounded field effect transistor of a load portion; reference symbol 124G designates a gate electrode of the source grounded field effect transistor 124; reference symbol 125G designates a gate electrode of the field effect transistor 125; and reference symbol 128G designates a gate electrode of the source grounded field effect transistor 128. Also, reference numeral 129 designates a contact hole, reference numeral 130 designates an active region, and reference numeral 131 designates a P-type well region.

As has already been described, if the operating current of the operational amplifier 120 changes, then the voltage drop of the common GND wiring 132 into which the operating currents are caused to flow changes accordingly to generate crosstalk in the signals of other columns. Hence, in the operational amplifier (amplification circuit) 120, the source grounded field effect transistor 124 is required to have a sufficient output resistance. Consequently, it is important that a channel length of the source grounded field effect transistor is made long enough to be free from an influence of the channel length modulation.

For this reason, it is desirable that the field effect transistors be disposed so as for their channel lengths to extend in a direction (corresponding to a direction vertical to a direction of repetitive disposition of the amplification circuits in this case, i.e., a Y-axis direction in the drawing) different from the direction of repetitive disposition of the amplification circuits (an X-axis direction in the drawing) limited by a pixel pitch. That is, the disposition is effective in which the direction of the channel length of the source grounded field effect transistor 124 is the direction (corresponding to the direction vertical to the direction of repetitive disposition of the amplification circuits in this case, i.e., the Y-axis direction in the drawing) different from the direction of repetitive disposition of the amplification circuits. Such a configuration can be grasped as causing a drain current of the source grounded field effect transistor 124 to flow in a direction different from the direction of repetitive disposition of the amplification circuits.

This importance increases since a pitch of repetitive disposition of the amplification circuits in the X-axis direction decreases along with reduction in pixel pitch.

Note that the direction different from the direction of repetitive disposition of the amplification circuits means a direction which is inclined with respect to the direction of repetitive disposition of the amplification circuits. While the gradient of that direction is set as may be necessary, that direction is preferably set as the direction vertical to the direction of repetitive disposition of the amplification circuits as in this embodiment in terms of layout. While the pitch of repetitive disposition of the amplification circuits is designed so as to correspond to the pixel pitch in many cases, the pitch of repetitive disposition of the amplification circuits may be designed so as to be wider or narrower than the pixel pitch in some cases.

As described above, the direction of the channel length of the source grounded field effect transistor 124 is set in the direction different from the direction of repetitive disposition of the amplification circuits, whereby the channel length of the source grounded field effect transistor 124 can be provided so as to be long without being limited by the pitch (indicated by X1 in FIG. 1) of repetitive disposition of the amplification circuits. In particular, this is suitable for a case where the channel length is set longer than the pitch of repetitive disposition of the amplification circuits.

In addition, an open loop gain becomes larger as $g_m$ (transconductance) of the input transistor 125 of the operational amplifier (amplification circuit) is larger. Thus, the direction (it can be grasped as a direction of flow of a drain current) of the channel length of the input transistor 125 is desirably set in the direction different from the direction (Y-axis direction) vertical to the direction of repetitive disposition of the operational amplifiers (amplification circuits) (this desirable direction is set in the direction of repetitive disposition of the amplification circuits in this embodiment). It is because $g_m$ of a field effect transistor is proportional to W/L (L is a channel length and W is a channel width), and thus it is advantageous that the channel width is allowed to be ensured in the direction (Y-axis direction) different from the direction of repetitive disposition limited by the pixel pitch. Note that while the direction different from the direction (Y-axis direction) vertical to the direction of repetitive disposition of the operational amplifiers (amplification circuits) means the direction which is inclined with respect to the direction vertical to the direction of repetitive disposition of the operational amplifiers and its gradient is set as may be necessary, that direction different therefrom is preferably set in the direction (the X-axis direction in the drawing) of repetitive disposition of the amplification circuits as in this embodiment in terms of layout.

When the input portion or the load portion has a cascode configuration, an output resistance of the amplification circuit is proportional to $g_m$ of a gate grounded field effect transistor. Thus, the direction (it can be grasped as the direction as well of flow of the drain current) of the channel length of the gate grounded field effect transistor is desirably set in the direction (it is set as the X-axis direction as the direction of repetitive disposition of the amplification circuits in this embodiment) different from the direction vertical to the direction of repetitive disposition of the amplification circuits. An embodiment in such a case as well will hereinafter be described.

Figure 4:
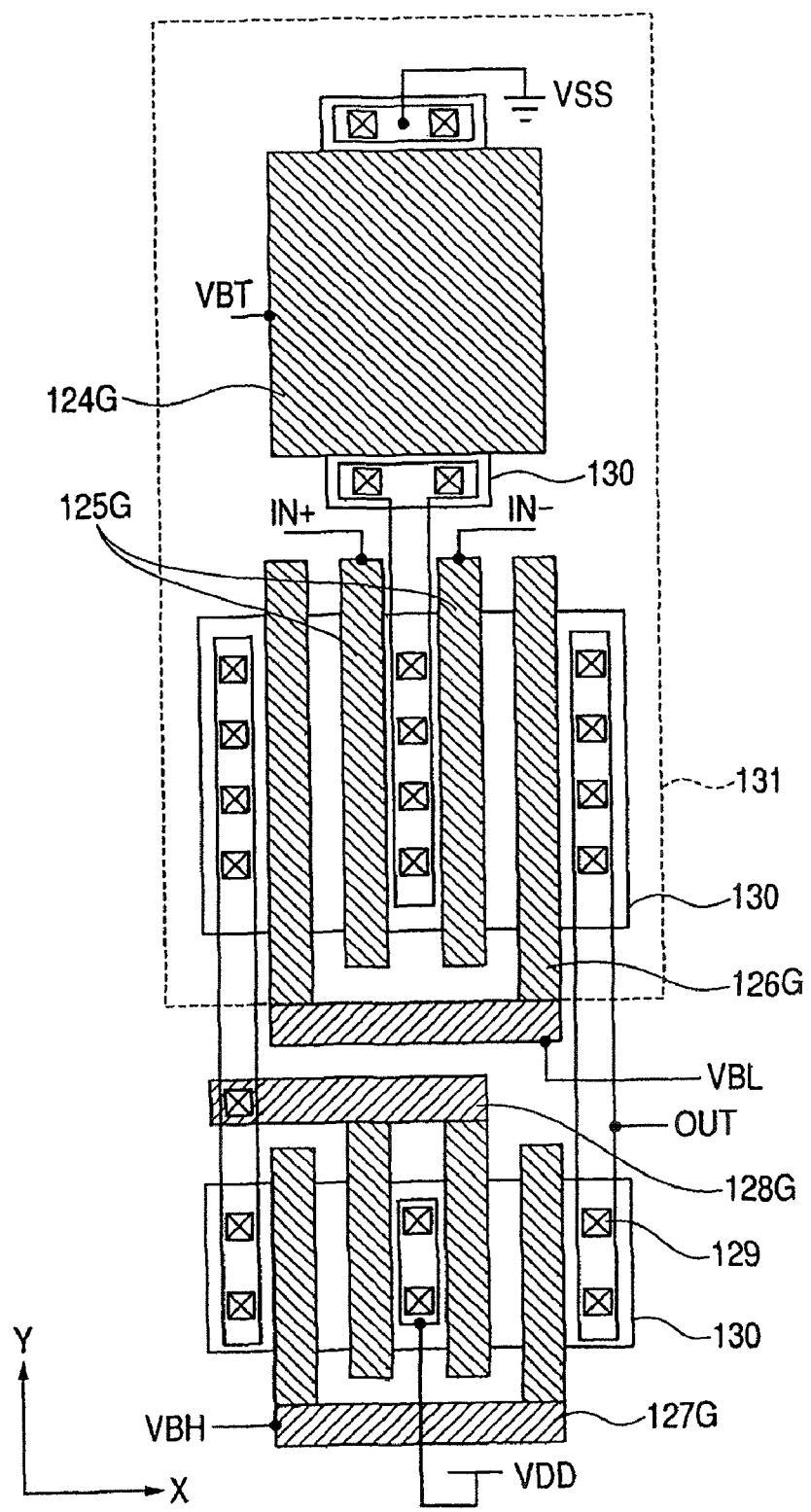
FIG. 4 is a plan view of an amplification circuit of a photoelectric conversion device according to a second embodiment of the present invention.
Figure 5:
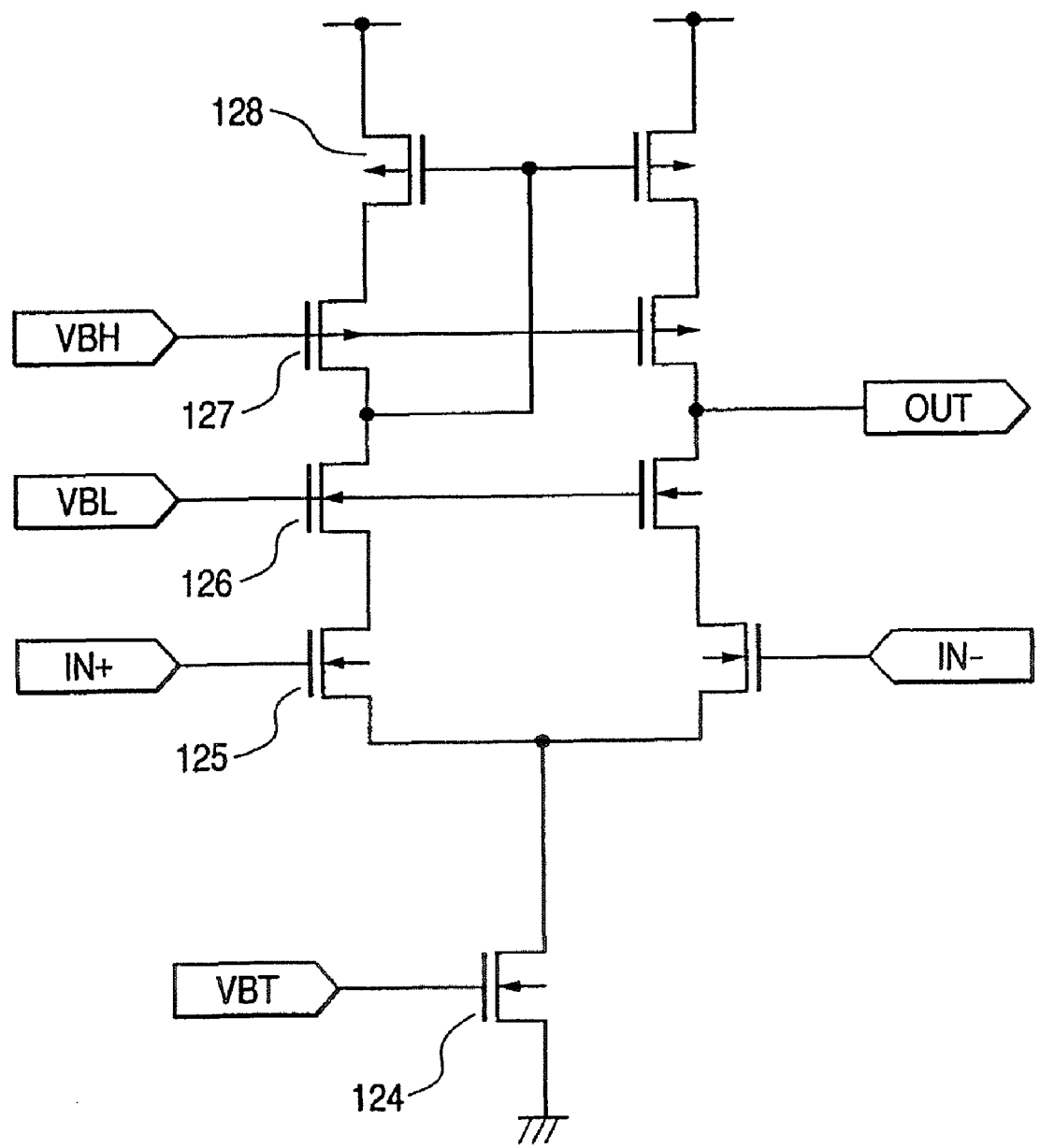
FIG. 5 is an equivalent circuit diagram of an amplification circuit of the photoelectric conversion device according to the second embodiment of the present invention.
Figure 6:
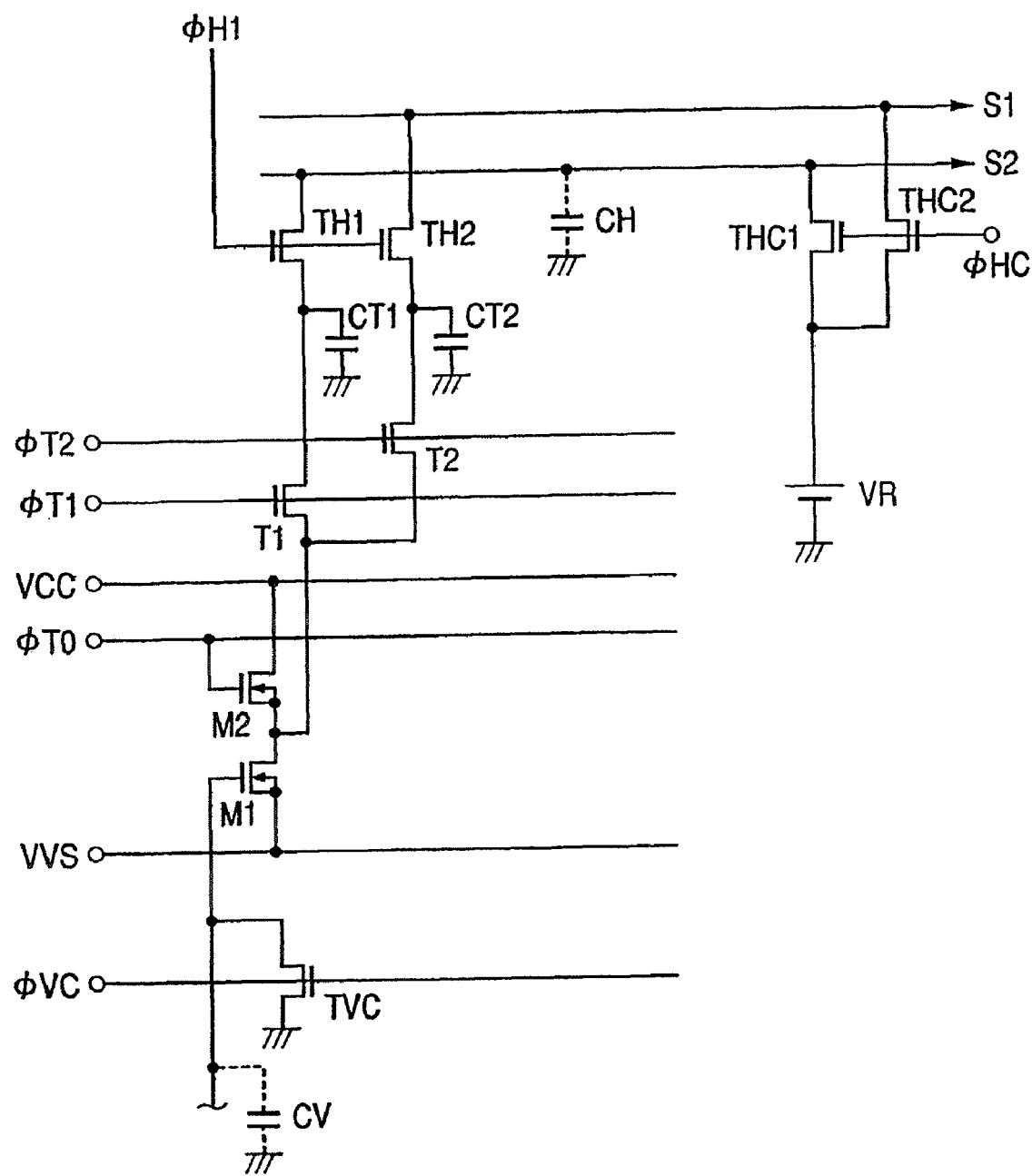
FIG. 6 is a circuit diagram of an equivalent circuit of a photoelectric conversion device according to a related art.

FIG. 4 is a plan view of an amplification circuit of a photoelectric conversion device according to a second embodiment of the present invention, and FIG. 5 is an equivalent circuit diagram of the amplification circuit of the photoelectric conversion device according to the second embodiment of the present invention. In FIGS. 4 and 5, the same constituent elements as those in FIGS. 1 and 2 are designated with the same reference symbols.

In FIGS. 4 and 5, reference numeral 124 designates a source grounded field effect transistor of a constant current circuit portion. Reference numeral 125 designates a field effect transistor as an input transistor, and reference numeral 126 designates a gate grounded field effect transistor. The field effect transistor 125 and the gate grounded field effect transistor 126 constitute an input portion having a cascode configuration. Reference numeral 127 designates a gate grounded field effect transistor, and reference numeral 128 designates a source grounded field effect transistor. The gate grounded field effect transistor 127 and the source grounded field effect transistor 128 constitute a load portion having a cascode configuration. Reference symbol 124G designates a gate electrode of the source grounded field effect transistor 124, reference symbol 125G designates a gate electrode of the grounded field effect transistor 125, reference symbol 126G designates a gate electrode of the gate grounded field effect transistor 126, reference symbol 127G designates a gate electrode of the gate grounded field effect transistor 127, and reference symbol 128G designates a gate electrode of the source grounded field effect transistor 128. Also, reference numeral 129 designates a contact hole, reference numeral 130 designates an active region, and reference numeral 131 designates a P-type well region.

In this embodiment, the direction of the channel lengths of the gate grounded field effect transistor 126 and the gate grounded field effect transistor 127 is set in the direction (the X-axis direction in the drawing) of repetitive disposition of the amplification circuits.

Next, a description will be given with respect to an image pickup system using the photoelectric conversion device according to the first and second embodiments of the present invention. As for the image pickup system using such a photoelectric conversion device, a still camera, a video camera, a copying machine, a facsimile and the like are given. Then, a detailed description will hereinafter be given with respect to an embodiment when the photoelectric conversion device according to the present invention is applied to a still camera with reference to FIG. 7.

Figure 7:
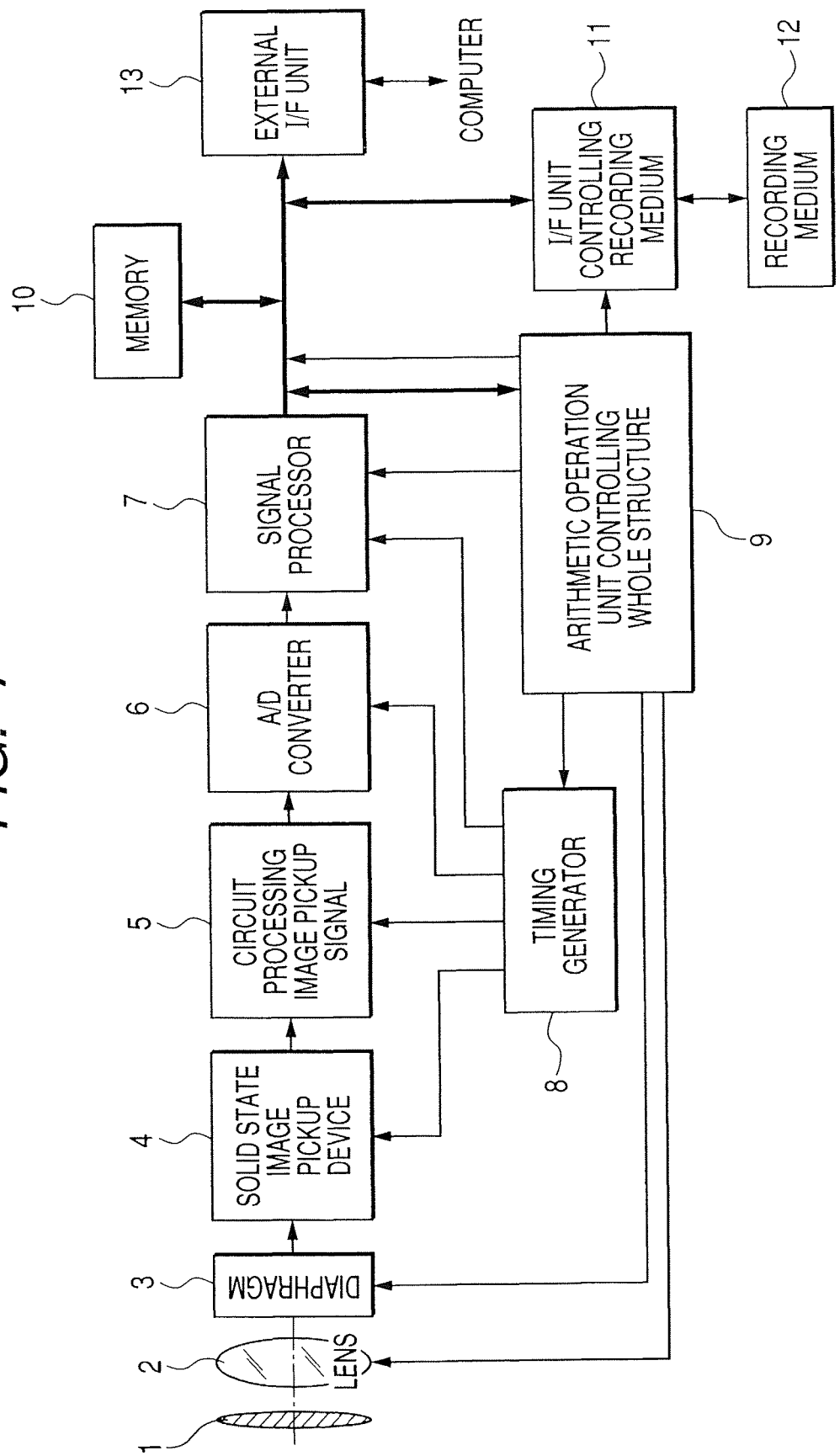
FIG. 7 is a block diagram showing a case where the photoelectric conversion device according to the present invention is applied to a still video camera.

FIG. 7 is a block diagram showing a case where a solid state image pickup device of the present invention is applied to "a still video camera".

In FIG. 7, reference numeral 1 designates a barrier serving both as a protector and as a main switch; reference numeral 2 designates a lens for forming an optical image of a subject on a surface of a solid state image pickup device 4; reference numeral 3 designates a diaphragm for making a quantity of light passed through the lens 2 variable; reference numeral 4 designates the solid state image pickup device for capturing an image of the subject formed by the lens 2 in the form of an image signal; reference numeral 6 designates an A/D converter for A/D-converting the image signal outputted from the solid state image pickup device 4; reference numeral 7 designates a signal processor for subjecting image data outputted from the A/D converter 6 to various corrections or compressing data; reference numeral 8, a timing generator for outputting various timing signals to the solid state image pickup device 4, a circuit processing image pickup signal 5, the A/D converter 6 and the signal processor 7; reference numeral 9, an arithmetic operation unit controlling whole structure for carrying out various arithmetic operations and controlling the whole still video camera; reference numeral 10, a memory for temporarily storing therein image data; reference numeral 11, an I/F unit controlling processing medium for recording or reading out data in or from a recording medium; reference numeral 12, a detachable recording medium, such as a semiconductor memory, in or from which the image data is to be recorded or read out; and reference numeral 13, an external I/F unit through which the still video camera is to communicate with an external computer or the like.

Next, a description will be given with respect to an operation of the still video camera during the photographing with the above-mentioned configuration.

Upon open of the barrier 1, a main power supply is turned ON, a power supply of a control system is next turned ON, and moreover a power supply of an image pickup system circuit such as the A/D converter 6 is turned ON.

Thereafter, in order to control the exposure, the arithmetic operation unit controlling whole structure 9 releases the diaphragm 3, and a signal outputted from the image pickup device 4 is then A/D-converted in the A/D converter 6 to be inputted to the signal processor 7. An arithmetic operation for the exposure is carried out based on the resultant data in the arithmetic operation unit controlling whole structure 9.

The brightness is judged based on the results of the photometry, and the arithmetic operation unit controlling whole structure 9 controls the diaphragm 3 in correspondence to the judgment results.

Next, high frequency components are taken out from the signal outputted from the solid state image pickup device 4 to carry out the arithmetic operation for obtaining a distance up to the subject in the arithmetic operation unit controlling whole structure 9. Thereafter, the lens 2 is driven to judge whether or not the focus is obtained. When the judgment results show that the focus is not yet obtained, the lens 2 is driven again to carry out the distance measurement.

After the focus is verified, the main exposure is started. After completion of the exposure, the image signal outputted from the solid state image pickup device 4 is A/D-converted in the A/D converter 6 to pass through the signal processor 7 to be written to a memory 10 by the arithmetic operation unit controlling whole structure 9. Thereafter, the data accumulated in the memory 10 passes through the I/F unit controlling recording medium 11 to be recorded in the detachable recording medium 12 such as a semiconductor memory in accordance with the control by the arithmetic operation unit controlling whole structure 9. Or, the data concerned may pass through the external I/F unit 13 to be directly inputted to a computer in order to process the image.

The present invention is applied to the photoelectric conversion device used in a still camera, a video camera, a copying machine, a facsimile or the like, and especially is suitably used in the photoelectric conversion device of high resolution for which the reduction in pixel pitch is required.

This application claims priority from Japanese Patent Application No. 2004-021542 filed on Jan. 29, 2004, which is hereby incorporated by reference herein.

What is claimed is:

1. A photoelectric conversion device comprising:
a plurality of pixel columns;
a plurality of signal output lines, wherein through each signal output line electrical signals are read out from each of the pixels of the pixel column; and
a plurality of amplification circuits, arranged repetitively, each of the amplification circuits corresponding, respectively, to each of the pixel columns for amplifying the electrical signals, wherein the plurality of amplification circuits include at least one constant current circuit, and wherein the amplification circuits are repetitively disposed extending in a predetermined direction,
wherein each of the constant current circuits includes at least a field effect transistor and a common grounded wiring common to the plurality of constant current circuits, wherein a direction parallel to a channel length of the plurality of the field effect transistors is different from the predetermined direction of the plurality of the amplification circuits, wherein each amplification circuit further includes an input transistor having a gate receiving the electrical signal from the signal output line, and wherein a direction parallel to a channel length of the input transistors is different from the direction parallel to the channel length of the field effect transistor of the constant current circuit, and the channel length of the input transistor is different from the channel length of the field effect transistor.

2. A photoelectric conversion device according to claim 1, wherein the field effect transistor is a source grounded field effect transistor.

3. A photoelectric conversion device according to claim 2, wherein a channel length of the source grounded field effect transistor is longer than a pitch of repetition disposition of the amplification circuits.

4. A photoelectric conversion device according to claim 1, wherein the amplification circuit includes an input transistor having a field effect transistor, and a direction of a channel length of the input transistor is a direction different from a direction vertical to the direction of repetitive disposition of the amplification circuits.

5. A photoelectric conversion device according to claim 4, wherein an input portion of the amplification circuit includes a cascode circuit having the input transistor and a gate grounded field effect transistor, and a direction of a channel length of the gate grounded field effect transistor is a direction different from a direction vertical to the direction of repetitive disposition of the amplification circuits.

6. A photoelectric conversion device according to claim 1, wherein the signal output line is provided in every column of the plurality of pixels, and the amplification circuit is provided on every signal output line.

7. A photoelectric conversion device according to claim 2 or claim 3, wherein when the source grounded field effect transistor is a first source grounded field effect transistor, a load portion of the amplification circuit includes a cascode circuit having a second source grounded field effect transistor and a gate grounded field effect transistor, and a direction of a channel length of the gate grounded field effect transistor is different from a direction vertical to the direction of repetitive disposition of the amplification circuits.

8. An image pickup system, comprising:
a photoelectric conversion device according to claim 1;
an optical system for forming an image based on light on the photoelectric conversion device; and
a signal processing circuit for processing an output signal from the photoelectric conversion device.

* * * * *